United States Patent
Grohol et al.

(10) Patent No.: US 8,999,872 B2
(45) Date of Patent: Apr. 7, 2015

(54) METHOD FOR MAKING POROUS MULLITE-TIALITE COMPOSITES

(75) Inventors: Daniel Grohol, Midland, MI (US); Mark L. Dreibelbis, Midland, MI (US); Michael T. Malanga, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/004,301

(22) PCT Filed: Mar. 29, 2012

(86) PCT No.: PCT/US2012/031053
§ 371 (c)(1),
(2), (4) Date: Sep. 30, 2013

(87) PCT Pub. No.: WO2012/135401
PCT Pub. Date: Oct. 4, 2012

(65) Prior Publication Data
US 2014/0128243 A1    May 8, 2014

Related U.S. Application Data

(60) Provisional application No. 61/468,644, filed on Mar. 29, 2011.

(51) Int. Cl.
*C04B 35/00* (2006.01)
*C01G 23/00* (2006.01)
(Continued)

(52) U.S. Cl.
CPC ............ *C01G 23/003* (2013.01); *C04B 35/185* (2013.01); *C04B 35/478* (2013.01);
(Continued)

(58) Field of Classification Search
CPC ...... C04B 35/18; C04B 35/46; C04B 35/495; C04B 2235/3418; C04B 2235/3215; H01B 3/12

USPC ............................... 501/134, 135, 128
See application file for complete search history.

(56) References Cited

U.S. PATENT DOCUMENTS

| | | | |
|---|---|---|---|
| 4,855,265 A | 8/1989 | Day et al. | |
| 5,045,514 A | 9/1991 | Ismail et al. | |

(Continued)

FOREIGN PATENT DOCUMENTS

| | | |
|---|---|---|
| EP | 0164028 B1 | 11/1990 |
| EP | 0726234 B1 | 4/1999 |

(Continued)

OTHER PUBLICATIONS

Hill, R.J., et al., J. Applied Crystallography 20, pp. 467-474, Jun. 23,1987, "Quantitative Analysis from Neutron Powder Diffraction Data Using the Rietveld Method", 1987 International Union of Crystallography.

(Continued)

*Primary Examiner* — Noah Wiese

(57) ABSTRACT

Porous composites of acicular mullite and tialite are formed by firing an acicular mullite body in the presence of an oxide of titanium. In some variations of the process, the oxide of titanium is present when the acicular mullite body is formed. In other variations, the oxide of titanium is applied to a previously-formed acicular mullite body. Surprisingly, the composites have coefficients of linear thermal expansion that are intermediate to those of acicular mullite and tialite alone. Some of the tialite is believed to form at grain boundaries and/or points of intersection between acicular mullite needles, rather than merely coating the needles. The presence of the titanium oxide(s) during acicular mullite formation does not significantly affect the ability to produce a highly porous network of mullite needles.

17 Claims, 1 Drawing Sheet

(51) Int. Cl.
*C04B 35/185* (2006.01)
*C04B 35/478* (2006.01)
*C04B 38/06* (2006.01)

(52) U.S. Cl.
CPC ..... *C04B2235/327* (2013.01); *C04B 2235/445* (2013.01); *C04B 2235/46* (2013.01); *C04B 2235/6562* (2013.01); *C04B 2235/6581* (2013.01); *C04B 2235/6583* (2013.01); *C04B 2235/78* (2013.01); *C04B 2235/9607* (2013.01); *C04B 38/0615* (2013.01); *C04B 2235/3201* (2013.01); *C04B 2235/3206* (2013.01); *C04B 2235/3208* (2013.01); *C04B 2235/3224* (2013.01); *C04B 2235/3225* (2013.01); *C04B 2235/3409* (2013.01); *C04B 2235/3445* (2013.01); *C04B 2235/349* (2013.01); *C04B 2235/80* (2013.01); *C04B 2235/85* (2013.01)

(56) References Cited

U.S. PATENT DOCUMENTS

| | | | |
|---|---|---|---|
| 5,079,064 | A | 1/1992 | Forsythe |
| 5,290,739 | A | 3/1994 | Hickman |
| 5,407,871 | A | 4/1995 | Mizutani et al. |
| 5,676,833 | A * | 10/1997 | Odaka et al. ............ 210/500.26 |
| 6,849,181 | B2 | 2/2005 | Ogunwumi et al. |
| 7,071,135 | B2 | 7/2006 | Ogunwumi et al. |
| 2005/0113249 | A1 | 5/2005 | Ziebarth |
| 2005/0115214 | A1* | 6/2005 | Saha et al. ...................... 55/523 |
| 2006/0021308 | A1 | 2/2006 | Merkel |
| 2011/0166018 | A1 | 7/2011 | Grohol et al. |

FOREIGN PATENT DOCUMENTS

| | | |
|---|---|---|
| WO | 9001471 | 2/1990 |
| WO | 9211219 A1 | 7/1992 |
| WO | 0145828 A1 | 6/2001 |
| WO | 03082773 A1 | 10/2003 |
| WO | 2004011124 A1 | 2/2004 |
| WO | 2004096729 A2 | 11/2004 |
| WO | 2006039255 A2 | 4/2006 |
| WO | 2009076985 A1 | 6/2009 |
| WO | 2010033763 A1 | 3/2010 |
| WO | 2011008463 A1 | 1/2011 |

OTHER PUBLICATIONS

Reed. J., New York State College of Ceramics, Alfred University, Alfred, New York, John Wiley & Sons, Introduction to the Principles of Ceramic Processing, Chapters 20 and 21, Wiley Interscience, 1988, pp. 132-166.

Oikonomou, P., et al., Journal of the European Ceramic Society, 27, pp. 3475-3482, Apr. 10, 2007, Elsevier Ltd., "Stabilized Tialite-Mullite Composites with Low Thermal Expansion and High Strength for Catalytic Converters".

Parker, Fred, J., et al., J. Am. Ceram. Soc. 1989, 72, (12), pp. 2364-2366, May 26, 1989, "Correlation Between Grain Size and Thermal Expansion for Aluminum Titanate Materials", W.R.Grace and Company-Conn., Columbia, Maryland 21044.

Ogunwumi, S.B., et al., SAE 100, SAE Technical Paper Series, 2005 SAE World Congress, Detroit, Michigan, Apr. 11-14, 2005, SAE International, 400 Commonwealth Drive, Warrendale, PA 15096-0001, U.S.A., Diesel Exhaust Emission Control 2005 (SP-1942), "Aluminum Titanate Compositions for Diesel Particulate Filters", SAE Paper #2005-01-0583, pp. 1-5.

Huang X., et al.; Journal of Materials Research, Materials Research Society, Warrendale, PA, US, vol. 15, No. 2, Feb. 1, 2000, pp. 357-363, XP002428334, ISSN: 0884-2914, "Thermal and mechanical properties of aluminum titanate-mullite composites", 2000 Materials Research Society.

Tsetsekou, Athena, Journal of the European Ceramic Society, 25, Apr. 1, 2005, 335-348, A comparison study of tialite ceramics doped with various oxide materials and tialite-mullite composites: microstructural, thermal and mechanical properties, Elsevier Ltd.

Popovskaya, N.F., et al., Mullite-Tialite Ceramic Materials Based on Chemically Precipitated Mixtures (A Review), Glass and Ceramics, vol. 59, Nos. 7-8, 2002, Belarus State Technological University, Minsk, Belarus, Plenum Publishing Corporation, 234-236, XP-001141416.

* cited by examiner

METHOD FOR MAKING POROUS MULLITE-TIALITE COMPOSITES

This application claims priority from U.S. Provisional Application No. 61/468,644, filed 29 Mar. 2011.

This invention relates to methods for making porous mullite-tialite composite bodies.

Acicular mullite takes the form of high aspect ratio needles. Masses of these needles form high surface area, highly porous structures. The acicular structure provides a combination of mechanical strength and high porosity that is quite beneficial. Acicular mullite also has excellent high temperature resistance. Due to this combination of properties, acicular mullite honeycombs are finding use as particulate traps for filtering soot from the exhausts emitted from power plants. The power plant may be mobile or stationary. An example of a mobile power plant is an internal combustion engine, such as a diesel engine. Stationary power plants include electricity and/or steam generating units. The porous acicular mullite bodies are also useful as catalyst supports, such as supports for precious metals in automotive catalytic converters.

A convenient way of manufacturing porous acicular mullite bodies starts with a "green body" that contains a source of aluminum and silicon atoms. By heating in the presence of a fluorine source, a fluorotopaz compound having the approximate chemical formula $Al_2(SiO_4)F_2$ is formed. Fluorotopaz is then thermally decomposed to form mullite, which has the approximate chemical formula $3Al_2O_3.2SiO_2$. The mullite crystals formed this way take the form of a mass of interconnected needles. The needles usually have diameters between 3 and 40 microns. The interconnected needles form a porous structure in which the pores constitute from 40 to 85% of the volume of the body. Approaches such as these are described in WO 90/01471, WO 99/11219, WO 03/82773 and WO 04/96729.

Acicular mullite has somewhat lower thermal shock resistance than is desired for applications such as particulate filters and catalyst supports, mainly due to its relatively high coefficient of thermal expansion, which is approximately 5.2 ppm per degree Celsius ($5.2 \times 10^{-6\circ}$ $C.^{-1}$) in the 20-800° C. temperature range. During thermal regeneration, an acicular mullite body used in some power plant operations can experience a temperature increase amounting to hundreds of degrees Celsius over a period of minutes or even seconds. Inadequate thermal shock resistance often leads to cracking under these conditions. It is possible to ameliorate this problem somewhat through the design of the filter. However, a more desirable approach is to improve the thermal shock resistance by focusing on the material properties of the ceramic, while maintaining other desirable attributes such as high porosity and good mechanical integrity.

There have been various attempts to form composites of mullite with another ceramic material that has a lower coefficient of thermal expansion than mullite.

Thus, for example, mullite-cordierite composites are described in U.S. Pat. No. 5,079,064, EP 0 164 028, U.S. Pat. No. 5,045,514 and U.S. Pat. No. 5,407,871. The composites described in these references are made using sol-gel or firing approaches and do not produce acicular mullite. The porosities of these bodies are generally not high enough for filtration and catalyst support applications, and the combination of mechanical strength and high porosity that is typical of acicular mullite structures is not achieved. In WO 2010/033763 there is described a method for making composites of acicular mullite and cordierite. In that process, an acicular mullite body is fired in the presence of sources of silicon and magnesium atoms to form a composite that has a coefficient of linear expansion less than that of acicular mullite alone. The acicular mullite itself may be formed in the presence of a source of magnesium atoms and then fired to produce the composite. This approach can produce high porosity composites that have good mechanical strength and low coefficients of thermal expansion.

Another composite material that has been explored is a mullite-aluminum titanate composite. Aluminum titanate exhibits a highly anisotropic thermal expansion (i.e., expansion that differs widely along the crystallographic axes). It is believed that this causes internal stresses within large aluminum titanate crystals, which results in microcracking as the material is cooled from the firing temperature at which it is produced. The microcracking in turn contributes to an overall low coefficient of thermal expansion and consequently to good thermal shock resistance, which is desirable, but also leads to the disadvantage of low mechanical strength. Therefore, various attempts have been made to increase the mechanical strength of aluminum titanate honeycombs by forming composites with mullite. U.S. Pat. No. 4,855,265, WO 2004/011124, WO 2006/0021308 and U.S. Pat. No. 7,071,135 all exemplify this approach. In each case, the composite is formed by firing a mixture of oxide precursors that contain aluminum, silicon and titanium atoms (and in some cases iron or rare earth atoms as well). This process does not produce acicular mullite. Therefore, porosity is imparted to the composite through the use of a sacrificial porogen and/or the use of large particle size precursors. As before, it is difficult using this approach to obtain a composite having high porosity, highly interconnected pores, adequate mechanical strength and thermal shock resistance.

It is desired to provide an acicular mullite body that has a useful combination of high porosity, good mechanical strength and a low coefficient of linear thermal expansion (CTE). A method by which such a porous acicular mullite body can be prepared is also desired.

This invention is in one aspect a porous composite ceramic body comprising interspersed and bonded acicular mullite and tialite crystals, wherein the acicular mullite crystals constitute from 25 to 95% by weight of the crystalline ceramic materials in the composite ceramic body, the tialite crystals constitute from 5 to 75% by weight of the crystalline ceramic materials in the ceramic body and other crystalline ceramic materials constitute from 0 to 5% by weight of the crystalline ceramic materials in the composite ceramic body.

Crystalline ceramic materials preferably constitute at least 50%, more preferably at least 75%, by weight of composite ceramic. The ceramic body preferably is at least partially acicular in morphology.

For purposes of this invention the term "tialite" is used to mean a crystalline aluminum titanate (approximate empirical formula $Al_2TiO_5$ or, equivalently, $Al_2O_3.TiO_2$), as well as crystalline iron aluminum titanates and crystalline rare earth aluminum titanates which contain iron and/or rare earth metal atoms within the crystalline structure.

$Fe^{3+}$ atoms can substitute for aluminum atoms within an aluminum titanate crystal lattice. $Fe_2TiO_5$ (pseudobrookite) is isomorphous with aluminum titanate; both materials crystallize within the same space group and with similar lattice dimensions. Solid solutions of $Al_2TiO_5$—$Fe_2TiO_5$ therefore can form. For purposes of this invention, crystalline iron aluminum titanates are considered to be "tialites". These iron aluminum titanates can be regarded as aluminum titanates in which some of the $Al^{3+}$ ions in the crystal lattice are replaced by $Fe^{3+}$ ions, or alternatively as solid $Al_2TiO_5$—$Fe_2TiO_5$ solutions. When the tialite is an iron-aluminum titanate, it is preferred that the tialite contains no more than about 0.33 mole of iron atoms per mole of aluminum atoms. A more preferred amount is from 0.02 to 0.25 mole of iron per mole of aluminum atoms and a still more preferred amount is from 0.025 to 0.1 mole of iron per mole of aluminum atoms.

Similarly, crystalline rare earth aluminum titanates are also considered to be "tialites" for purposes of this invention. These rare earth aluminum titanates can be regarded as $Al_2TiO_5$ materials in which some of the aluminum atoms are replaced with rare earth metal atoms, or alternatively as solid $Al_2TiO_5$—$RE_2TiO_5$ solutions, where "RE" refers to a rare earth metal atom. When the tialite contains rare earth atoms, it is preferred that the tialite contains no more than about 0.33 mole of rare earth atoms per mole of aluminum atoms. A more preferred amount is from 0.025 to 0.1 mole of rare earth atoms per mole of aluminum atoms.

In some embodiments, acicular mullite crystals constitute 40 to 80% by weight, and tialite crystals constitute 15% to 60% by weight of the crystalline ceramic materials in the composite ceramic body. In other embodiments, acicular mullite crystals constitute 50 to 80% by weight, and tialite crystals constitute 20% to 50% by weight of the crystalline ceramic materials in the composite ceramic body. In still other embodiments, acicular mullite crystals constitute 65 to 80% by weight, and tialite crystals constitute 15% to 35% by weight of the crystalline ceramic materials in the composite ceramic body.

Other crystalline ceramic materials, if present at all, preferably constitute no more than 2% of the weight of the crystalline ceramic body. Such other crystalline materials may include, for example, various forms of silica such as cristobalite or tridymite, products of incomplete reaction such as sapphirine and spinel, residual $TiO_2$ or other oxides of titanium and the like. Crystalline silica phases, especially cristobalite, are generally undesirable. Cristobalite undergoes a crystalline phase transition in the range of 200-250° C., which is accompanied by a volumetric expansion. This adds to the CTE of the composite and in turn can reduce the thermal shock resistance of the material. Most preferably, the crystalline ceramic materials in the composite ceramic body include no more than 1 percent, especially no more than 0.5%, each of cristobalite, spinel and sapphirine.

The presence and relative proportions of the crystalline components of the composite (including the acicular mullite and tialite) can be determined using powder X-ray diffraction methods. Cobalt or copper X-ray sources are suitable. The sample may be rotated if desired to improve signal intensity. The qualitative analysis of the presence of acicular mullite, tialite and other crystalline materials is conveniently done by matching the X-ray diffraction pattern against patterns of known materials. Commercially available software packages such as Jade Version 9.3 software (available from Material Data Incorporated) or equivalents thereto conveniently perform such qualitative analyses. Quantitative analysis to determine the relative amounts of acicular mullite, tialite and other crystalline materials can be performed using whole pattern fitting quantitative analysis methods such as described, for example, by R. J. Hill & C. J. Howard in *J. Applied Crystallography* 20, 467 (1987). Whole pattern fitting quantitative analyses also are performed using a commercially available software package such as Jade Version 9.3 software (available from Material Data Incorporated), or equivalent.

The composite ceramic body may contain one or more amorphous phases, which preferably constitute no more than 10% and still more preferably no more than 5% of the total weight of the composite ceramic body. The amorphous phase (s) can be fully or partially interspersed with the crystalline materials.

Individual acicular mullite and tialite crystals that are interspersed in the composite ceramic body typically will have largest dimensions of no greater than 1 mm, and in some embodiments these crystals have largest dimensions of no greater than 500 lam, still more preferably no greater than 100 μm. The individual acicular mullite and tialite crystals typically will be at least 10 nm, more preferably at least 50 nm in at least one dimension. The acicular mullite and tialite crystals may be bonded directly to each other, or bonded indirectly through, for example, an amorphous phase and/or another crystalline material. In some embodiments, at least part of the tialite crystals are located between acicular mullite grain boundaries.

The composite ceramic body in most cases, except at very low tialite contents, has a lower coefficient of thermal expansion (CTE) than acicular mullite alone. The CTE generally decreases with increasing tialite content. The CTE values for the composite ceramic bodies often are no greater than 5 ppm/° C. over the temperature range from 20 to 800° C. At high tialite contents, the CTE can be as low as 1 ppm/° C. over this range or even lower. In some embodiments the CTE may be from 1.0 to 5.0 ppm/° C., from 2.0 to 5.0 ppm/° C., or from 3.0 to 5.0 ppm/° C. over the temperature range from 20 to 800° C. For purposes of this invention, CTE is determined by measuring changes in the length of a sample as it is heated in air at a rate of 5° C./minute over that temperature range. CTE is measured using a dilatometer such as Du Pont model 2940 or equivalent device.

The large reduction in CTE through the formation of the tialite phase is highly desirable, but is unexpected because a continuous acicular mullite structure is either used as a starting material or formed as an intermediate. The addition of tialite to such a continuous structure would not be expected to result in a significant reduction of CTE in such a case, because it would be expected that the CTE would be dominated by the continuous nature of the acicular mullite needle structure. Tialite that randomly forms merely on the surface of the acicular mullite crystals in such a continuous mullite needle structure would be expected to have little effect on the CTE of a composite as a whole. In such a structure, the rule of mixtures would not be expected to apply, as the CTE is controlled mainly by one component of the composite, i.e., the acicular mullite needle structure, due to the expected continuity of its structure. Instead, and surprisingly, some of the tialite appears to form at least in part between acicular mullite grain boundaries, possibly being concentrated at the intersections of individual acicular mullite needles. Although the invention is not limited to any theory, tialite that forms between grain boundaries is believed to contribute to the reduction in CTE by disrupting the continuity of the acicular mullite needle structure. This could account for the reduction of the CTE of the composite material compared to that of the starting acicular mullite structure.

Another advantage of the invention is that much of the porous and needle-like structure of the acicular mullite intermediate is retained. The resulting ceramic body therefore is porous and in most cases highly porous, with porosities that potentially range from 30 to as much as 85 volume percent and more typically range from 45 to 75% or from 48 to 65% or even from 48 to 60%, as determined by mercury porosimetry. The needle-like morphology of the acicular mullite tends to be retained in the body, although the acicular nature tends to decrease with increasing tialite content. The composites are useful in filtration and catalyst support applications due to their high porosity.

The composite also has mechanical strength that is generally higher than that of porous tialite alone, at an equivalent porosity.

Still another advantage of the invention is that the surfaces of the body tend to be smoother, i.e., fewer acicular mullite needles tend to extend from the surface of the body, or extend less far on average from the surface of the body, than is the case with conventional acicular mullite bodies that do not contain significant levels of tialite. This effect is often seen even at comparable porosities, so that surface smoothness is not obtained at the expense of porosity. This can be very important in filter applications, because protruding needles can decrease air flow and, conversely, increase the pressure drop of the filter.

This invention is also a process for forming an acicular mullite-tialite composite body, comprising firing an acicular mullite body at a temperature of from 1450 to 1750° C. in the presence of a source of titanium atoms, to produce the acicular mullite-tialite composite body.

The acicular mullite body can be produced beforehand, and then combined with a source or sources of aluminum and titanium atoms and fired to produce the body. However, it is generally preferred to form the acicular mullite body in the presence of the tialite precursors (i.e., an source of titanium atoms and an excess of the source of aluminum atoms over that amount needed to produce the acicular mullite). Therefore, in certain embodiments, this invention is a process for forming a composite acicular mullite-tialite body comprising the steps of:
(a) forming a green body containing a source or sources of aluminum, silicon and titanium atoms;
(b) heating the green body in the presence of a gaseous fluorine source at a temperature sufficient to convert a portion of the green body to fluorotopaz;
(c) further heating the green body at a temperature of from 850° C. to 1250° C. under conditions such that the fluorotopaz decomposes to form a porous acicular mullite body that contains, in addition to the acicular mullite, one or more titanium compounds and one or more aluminum compounds; and
(d) firing the porous acicular body at a temperature of from 1450° C. to 1750° C. to cause at least a portion of the titanium compound(s) and at least a portion of the aluminum compound(s) to react to form a tialite and produce the acicular mullite-tialite composite body.

Figure 1:
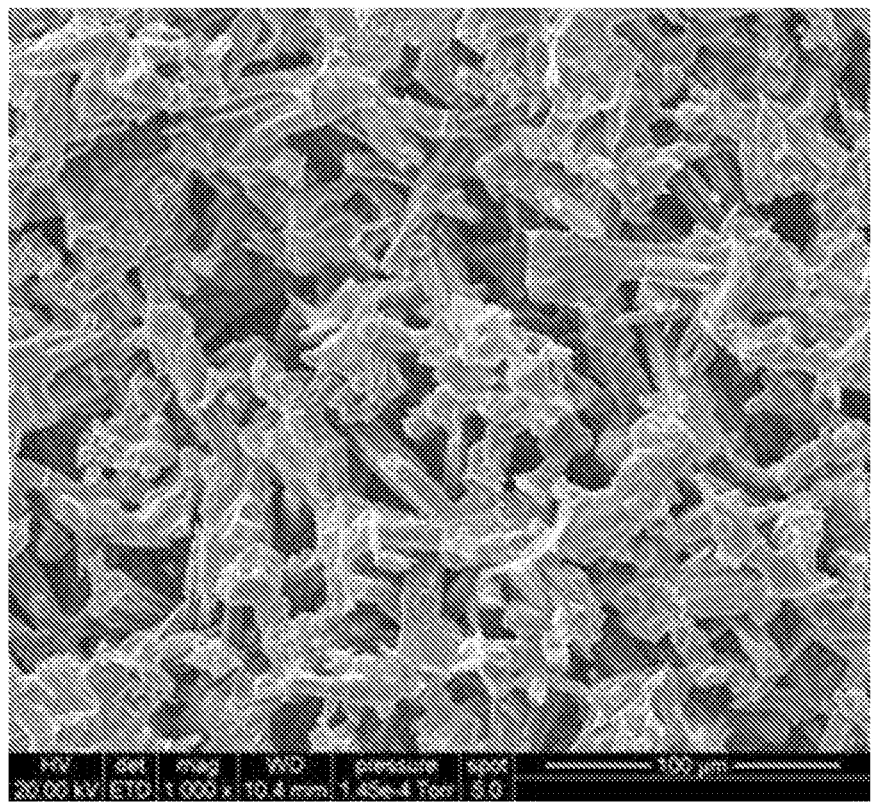
FIG. 1 is a micrograph of an embodiment of a ceramic body of the invention as described in Example 4.

In preferred embodiments of the invention, the composite is formed from a green body which is composed at least in part of one or more sources of aluminum, silicon and titanium. If the tialite is to be an iron aluminum titanate or rare earth aluminum titanate, a source of iron and/or a rare earth is also present. The green body is then reacted to form acicular mullite, and further reacted to form an acicular composite mullite-tialite body.

The aluminum source may be, for example, an organoaluminum compound such as an aluminum alkoxide, an aluminum halide, aluminum nitrate, aluminum chlorate, aluminum carbonate, aluminum silicate, an aluminum carboxylate such as aluminum acetate or, preferably, an aluminum oxide. Oxides of aluminum include any of the various crystalline forms of alumina (empirical formula approximately $Al_2O_3$), including the $\alpha$-, $\delta$-, $\eta$-, $\theta$-, $\kappa$-, $\gamma$-, or $\chi$-forms, as well as naturally-occurring alumina minerals such as corundum.

The source of silicon can be, for example, a siloxane compound or a silicon oxide. Oxides of silicon include crystalline silica (such as powdered quartz), fumed silica and other silicon dioxide materials that have an empirical formula of approximately $SiO_2$.

The titanium source may be, for example, titanium nitrate, titanium chlorate, titanium carbonate or titanium silicate, a titanium carboxylate such as titanium acetate, a titanium alkoxide, a titanium halide, or a titanium oxide. Oxides of titanium include any and all forms of titanium dioxide with the empirical formula $TiO_2$, including rutile, anatase, brookite, high pressure monoclinic baddeleyite-like form and high-pressure orthorhombic $\alpha$-$PbO_2$-like form, and synthetic forms of titanium dioxide such as monoclinic, tetragonal and orthorhombic forms. Suboxides of titanium are also useful, "suboxides" referring to titanium-oxygen compounds in which the ratio of oxygen atoms to titanium atoms is less than 2:1. Examples of such suboxides include $Ti_3O_5$, $Ti_4O_7$ and the like.

Suitable iron sources include iron halides, fluoride, iron nitrate, iron chlorate, iron carbonate, iron silicate, an iron carboxylate such as iron acetate, an iron alkoxide, and iron oxides such as iron (II) oxide (FeO, wuestite), iron (II, III) oxide ($Fe_3O_4$, magnetite), iron (III) oxide ($Fe_2O_3$, including $\alpha$-$Fe_2O_3$ (hematite), ($\beta$-$Fe_2O_3$, $\gamma$-$Fe_2O_3$ (maghemite) and $\epsilon$-$Fe_2O_3$), as well as other naturally-occurring or synthetic iron oxides.

Suitable sources of rare earth oxides include various halides, nitrates, chlorates, carbonates, silicates, carboxylates, alkoxides and oxides of rare earth elements. The rare earth may be for example, La, Ce, Pr, Nd, Sm, Eu, Gd, Tb, Dy, Er, Yb, Y and Sc, as well as mixtures of two or more thereof.

One or more mixed compounds (I.e., compounds that contain at least two different atoms selected from aluminum, silicon, titanium, iron and a rare earth metal) may be present, and if present can form all or part of the source of each of the corresponding elements. Thus, for example, a single material such as a hydrated aluminum silicate may fulfill all or part of the requirement for an oxide of aluminum and all or part of the requirement for an oxide of silicon. Examples of such hydrated aluminum silicates include various clays, mullite, and various zeolites. Aluminum titanate may fulfill all or part of the requirement for an oxide of aluminum and all or part of the requirement for an oxide of titanium. An aluminum iron titanate or aluminum rare earth titanate may fulfill all or part of the requirement for an oxide of aluminum, all or part of the requirement for an oxide of titanium and all or part of the requirement for an oxide of iron or a rare earth metal. Ilmenite ($FeTiO_3$) can be used as a source of both iron and titanium.

One useful green body contains alumina, silica and at least one of titanium dioxide and aluminum titanate. Another useful green body contains mullite and at least one of titanium dioxide and aluminum titanate. In either case, the green body may further contain an oxide of iron and/or at least one rare earth oxide.

Still another green body includes at least one aluminosilicate clay (such as, for example, a ball clay) that may be at least partially calcined, alumina, talc, titanium dioxide and optionally iron oxide and/or one or more rare earth oxides. In a particularly preferred embodiment, the green body contains fresh ball clay, calcined clay, alumina, talc, titanium dioxide and optionally iron oxide and/or one or more rare earth oxides.

The ratio of starting materials in the green body depends on the relative proportions of acicular mullite and tialite that are desired in the product. These proportions are determined mainly by (1) the ratio of moles of silicon atoms to moles of titanium atoms in the starting body and (2) the extent to which the tialite-forming reaction becomes completed as the green body is processed into the final composite body.

Theoretically, a green body containing silicon and titanium atoms (both in the form of oxides) in a mole ratio of about 0.28:1 will produce a composite body containing acicular mullite and tialite in a 25:75 weight ratio. This estimate assumes that enough of the aluminum source(s) (and sources of iron or rare earth, if an aluminum iron titanate or aluminum rare earth titanate is to be formed) are present and all of the starting materials are converted to acicular mullite and tialite. A green body containing silicon and titanium atoms in a mole ratio of about 16.5:1 theoretically will produce a composite body containing acicular mullite and tialite at a 95:5 weight ratio, on the same assumptions. Silicon:titanium mole ratios of 0.56:1, 0.85:1 and 3.4:1 theoretically produce acicular mullite and tialite at weight ratios of 40:60, 50:50 and 80:20, respectively.

However, it has been found that the reaction often produces less tialite than would be expected on the basis of the composition of the starting materials. This may be due to the formation of one or more titanium-containing glassy phases. It is also possible that some titanium reacts during the process to form gaseous species which escape from the body. For example, titanium oxides may react with $SiF_4$ to produce $TiF_4$, which is gaseous under the reaction conditions and thus may result in a loss of titanium and a corresponding decrease in the amount of tialite that is formed in the body. However, the loss of titanium through the formation of gaseous species is believed to be small.

Therefore, it is generally preferred to include more of the titanium source(s) in the green body than is theoretically required to obtain a given target tialite content. A suitable molar ratio of silicon atoms to titanium atoms in the green body is from about 0.25:1 to about 15:1. A more preferred molar ratio is from 0.5:1 to 3:1. As before, the silicon and titanium preferably are provided in the form of oxides.

The aluminum source(s) preferably are present in the green body in at least a stoichiometric amount, based on the amount of silicon atoms and titanium atoms. A stoichiometric amount is an amount sufficient to provide at least 1.5 moles of aluminum atoms per mole of silicon atoms, plus at least 1.5 moles of aluminum atoms per mole of titanium atoms in the case where the tialite is an aluminum iron titanate or aluminum rare earth titanate, or at least 2.0 moles of aluminum atoms per mole of titanium atoms in the case where the tialite is aluminum titanate. It is preferred in all cases that the green body contains (preferably in the form of oxides) at least 1.5 moles of aluminum atoms per mole of silicon atoms plus at least two moles of aluminum atoms per mole of titanium atoms. It is more preferred that an excess of aluminum atoms are present in the green body.

Iron source(s), if present, are generally present in the green body in amounts to provide up to 0.33, more preferably from 0.02 to 0.25 and still more preferably from 0.025 to 0.1, moles of iron atoms per mole of titanium atoms.

Rare earth source(s), if present, are generally present in the green body in amounts to provide up to 0.33, more preferably from 0.025 to 0.1 moles of rare earth atoms per mole of titanium atoms.

The various aluminum, silicon and titanium oxides sources constitute from 55 to about 100 weight percent, preferably from 80 to 99 weight percent, of the green body, exclusive of any liquids, organic materials and porogens that may be present.

The green body may contain various other materials, such as sintering aids, various impurities such as are often present in natural clay starting materials, or an oxide of one or more of Ca, Na, K, B or Y, or a compound of one or more of the foregoing which forms an oxide when heated in air. If not an oxide, the compound may be, for example, a chloride, fluoride, nitrate, chlorate, carbonate or silicate, or a carboxylate such as acetate. If the compound contains silicon (such as a silicate), the amount of silicon provided by the compound should be taken into account in calculating the aluminum-silicon ratio and titanium-silicon ratio in the green body. If used, the compound suitably constitutes at least 0.01, preferably at least 0.1, more preferably at least 0.5 and even more preferably at least 1 percent of the weight of the green body, exclusive of any liquid, organic materials and porogens that may be present. It may constitute as much as 12 percent of the weight of the green body, but preferably constitutes up to 10, more preferably up to about 5 and even more preferably up to 2 percent of the weight of the green body, exclusive of any liquid, organic materials and porogen as may be present.

A binder can be, and preferably is, mixed in with the other materials to help bind the particles of the starting materials together until the green body is fired. The binder is suitably an organic polymer, which may be soluble in water or some other solvent. A preferred type of binder is a water-soluble organic polymer, especially a cellulose ether such as methyl cellulose. In general, the binder may constitute from about 1 to about 10 percent of the weight of the green body. A more preferred amount is from about 2 to 8 weight percent.

The green body may also contain one or more porogens. Porogens are particulate materials which combust or thermally degrade (preferably at a temperature of 1100° C. or below) under the conditions of the heating steps to produce gaseous combustion or degradation products. Preferred porogens include carbon or graphite particles. Carbon and graphite particles having particle sizes as described above are commercially available from many sources. One suitable source of carbon and graphite particles is Asbury Carbons, Inc., Asbury, N.J. The carbon or graphite particles preferably have a carbon content of at least 80% by weight, more preferably at least 90% by weight, even more preferably at least 95% by weight and still more preferably at least 98% by weight.

The green body is formed in substantially the shape and dimensions required of the final part.

The green body is made by forming a mixture of the starting materials and shaping it. The green body can be prepared using any suitable method. Wet or dry methods can be used. Wet methods are preferred. In a wet method, a carrier liquid such as water or an organic liquid is blended with the starting materials to form a viscous putty or paste which can be processed by extrusion or molding techniques. Alcohols, glycols, ketones, ethers, aldehydes, esters, carboxylic acids, carboxylic acid chlorides, amides, amines, nitriles, nitro compounds, sulfides, sulfoxides, sulfones and the like are suitable carrier liquids, although water is most preferred. The amount of carrier fluid may affect the porosity of the composite, as larger amounts of carrier fluid occupy more of the volume of the green body. When the carrier fluid is removed, voids can form in the spaces formerly occupied by the carrier fluid, increasing the porosity of the composite. Increasing the amount of carrier fluid can also increase the amount of shrinkage that the part undergoes as it is transformed from the green body to the finished composite. Therefore, the amount of carrier fluid can be a process variable that can be controlled to affect to some extent certain properties of the final product.

The starting materials can be mixed together using ball milling, ribbon blending, vertical screw mixing, V-blending, attrition milling or any other suitable technique. The mixed materials are then formed into the desired shape, using, for example, processes such as injection molding, extrusion, isostatic pressing, slip casting, roll compaction, tape casting and the like. Suitable processes are described in *Introduction to the Principles of Ceramic Processing*, J., Reed, Chapters 20 and 21, Wiley Interscience, 1988. Binders may be burned out before the green body is converted to fluorotopaz and then to acicular mullite and tialite.

If a binder or other organic material or a porogen is present, or a wet method is used to produce the green body, the green body should be dried and the organic materials and/or porogen burnt out. The green body may be calcined prior to performing the mullitization reaction. Calcination can be performed on a green body made in a dry method, as well. These steps are done by heating the green body under vacuum or in an inert atmosphere such as nitrogen or a noble gas. Binder and porogen removal can be performed at temperatures of 300 to 900° C. Calcination occurs at a temperature of at least 1000° C., up to 1400° C. The calcination step is conducted for a period of time sufficient to increase the fracture strength of the green body. The amount of time needed will depend somewhat on the part size and porosity. Typically, from 15 minutes to 5 hours is sufficient.

In certain embodiments of the process, after removal of organics and porogens, the green body is partially converted to acicular mullite and then partially to tialite in a three-step process. In the first step, the green body is heated in the presence of a process gas that comprises a fluorine-containing compound. This step forms a fluorotopaz from a portion of the starting materials. In the second step, the fluorotopaz is decomposed to form acicular mullite. In the third step, the body is further heated in an oxidizing atmosphere to produce tialite from the oxides of titanium, a portion of the aluminum-containing compounds and iron and/or rare earth compounds if present. The result is a composite of acicular mullite and tialite. This composite may contain 25% or more by weight of non-crystalline materials. The crystalline phase may contain up to 5% by weight of inorganic crystalline materials other than acicular mullite and tialite.

The first, fluorotopaz-forming step is performed by heating the green body in the presence of a process gas that contains a fluorine-containing compound. The fluorine-containing compound is suitably $SiF_4$, $A_1F_3$, HF, $Na_2SiF_6$, NaF, $NH_4F$, fluorocarbon-containing gas, or some mixture of any two or more thereof. $SiF_4$ is preferred. The temperature during this step may be from 700° C. to as high as 1200° C. However, temperatures of 900° C. or lower, especially 800° C. or lower, are preferred during this step, as at higher temperatures the fluorotopaz decomposition reaction can predominate. The lower temperatures permit the fluorotopaz formation to occur separately from the decomposition reaction that converts fluorotopaz to mullite. It is typically preferred to heat the green body under vacuum or in an inert atmosphere such as nitrogen or a noble gas until it attains a temperature of at least 500° C. Thereafter, the fluorine-containing compound is introduced into the furnace, and heating is continued until the desired temperature for the fluorotopaz-forming step is achieved.

The process gas during the fluorotopaz-forming reaction may contain up to 100% of the fluorine-containing compound, but it is also possible to use a mixture that contains from 80 to 99%, especially from 85 to 95%, by weight of the fluorine-containing compound, with the remainder being various gaseous by-products that form from impurities contained in the starting materials or from the fluorotopaz-forming or acicular mullite-forming reactions.

A flow of the process gas may be established in the furnace during the fluorotopaz-forming step. This may promote more uniform reaction rates between individual bodies that are being processed together, and in some cases even within a single body, by replenishing the fluorine-containing compound to regions of the oven from which it may have become depleted.

The partial pressure of the fluorine-containing compound in the furnace throughout the first reaction step can be adjusted or maintained to a desired level, and/or may be allowed to vary during the course of the reaction. Control over the partial pressure of the fluorine-containing compound allows for some control over the reaction rate, which in turn allows for some control over the temperature of the green body or bodies during the fluorotopaz-forming step. The partial pressure of the fluorine-containing compound may be as low as 0 torr in early stages of the reaction, when the fluorine-containing compound can be consumed at about the same rate as it is fed into the reaction. The reaction vessel instead may be maintained at a predetermined partial pressure of the fluorine-containing compound, at least during the latter stages of the fluorotopaz-forming reaction.

After the fluorotopaz is formed, the body is heated under conditions such that the fluorotopaz decomposes to form acicular mullite. Fluorotopaz is decomposed by further increasing the reaction temperature, decreasing the partial pressure of the fluorine-containing compound, or by some combination of both. Fluorotopaz releases silicon tetrafluoride gas as it decomposes. This process is endothermic. The temperature reached during the fluorotopaz-decomposition step is preferably at least 900° C., and may be as high as 1200° C. A more preferred temperature is at least 1050° C., or at least 1100° C. The body should be held at that temperature until the fluorotopaz decomposition is complete. The decomposition reaction is complete when the body no longer releases silicon tetrafluoride. The decomposition heating step can be performed immediately after the fluorotopaz-forming step, without cooling the body. Alternatively, the fluorotopaz-containing body can be cooled, and then re-heated to perform the fluorotopaz-decomposition step.

The fluorotopaz decomposition reaction is generally performed in a non-oxidizing atmosphere. The fluorine-containing compound may be present in the process gas during this step, but the partial pressure thereof is advantageously not greater than 755 torr (100 kPa) and can be any lower value, including zero torr. The partial pressure of the fluorine-containing compound can be used as a process variable for controlling the size of the mullite needles that are formed during this step. It is preferred to conduct this second step in an atmosphere that contains either none of the fluorine-containing compound or a partial pressure of the fluorine-containing compound which is no more than 250 torr (33.2 kPa), preferably from 50 to 250 torr (6.7 to 33.2 kPa) or from 50 to 150 torr (6.7 to 20 kPa).

As the fluorotopaz decomposes, acicular mullite crystals form in the body. The acicular mullite crystals are bonded together at points of contact to form a porous mass having essentially the same overall geometry and dimensions as the green body. The aspect ratio of the acicular mullite crystals is typically at least 5, preferably at least 10, more preferably at least 20. The crystals may have a mean grain diameter of 3 to 40 microns.

At the end of the fluorotopaz decomposition reaction, the body contains a crystalline phase that contains mainly acicular mullite. The crystalline phase may include titanium oxides and, if iron oxides and/or rare earth oxides are present in the starting green body, various iron titanium oxides and/or rare earth titanium oxides. These various oxides of titanium tend to include suboxides such as $Ti_3O_5$, $Ti_4O_7$, $Fe_2TiO_5$, $Fe_3Ti_3O_{10}$ and the like, although some $TiO_2$ may be present. The body at this point also may contain an amorphous phase which may include various compounds of aluminum and/or titanium. The body obtained at the end of the fluorotopaz decomposition reaction usually contains little (typically less than 5% more preferably less than 3%, by weight of all the crystalline materials) or no tialite, even in those cases which tialite is present as a starting material in the green body. The body at this stage of the process has a porous structure that is typical of acicular mullite. The acicular mullite in the structure takes the form of elongated needles which are joined together at the points where they intersect.

This acicular mullite body is further heated to produce tialite. This can be done immediately after the fluorotopaz decomposition step is completed, without cooling the body. Alternatively, the body can be cooled after the fluorotopaz decomposition step and then re-heated. The latter approach is favored because the steps are typically performed in different equipment and/or at different times due to the difference in the atmosphere.

The temperature during the tialite-forming step is suitably from 1450 to 1750° C. Higher conversions to tialite are seen when the temperature is at least 1475° C. or, more preferably, at least 1500° C. Although tialite is seen to form at temperatures as low as 1400° C. (and perhaps lower), it has been found that lower CTE composites tend to be obtained when the temperature is at least 1450° C. A preferred upper temperature during this step is 1600° C.

The rate at which the temperature of the body is raised during the tialite-forming step has been found to affect the dimensional stability of the resulting composite. Warping is sometimes seen when the body is brought rapidly to the processing temperature, especially as the body is heated from about 1100° C. up to the processing temperature. It has been found that this warping can be reduced significantly if the body is heated at a somewhat slow rate, at least across the temperature range of 1100° C. to the processing temperature. Therefore, in a preferred embodiment, the tialite-forming step is performed by heating the body to about 1100° C. at any convenient heating rate, and then further heating the body from 1110° C. to the processing temperature at a somewhat low rate, such as from 5 to 100° C./hour, more preferably from 5 to 75° C./hour and still more preferably from 25 to 60° C./hour. The body may be heated to 1100° C. from a lower temperature (such as from below 50° C.) at a similarly low rate if desired.

The tialite-forming step is preferably performed under an oxidizing atmosphere. The oxidizing atmosphere may be, for example, air, oxygen-enriched air, pure oxygen, or other atmosphere that preferably contains at least 15 weight percent molecular oxygen. The atmosphere may contain some moisture to facilitate the removal of residual fluorine during this step. During this heating step, titanium-containing compounds as are present at this stage of the process react with aluminum-containing compounds as are present (which may include acicular mullite) to form tialite. If iron or rare earth compounds are present, these may also react with titanium and aluminum compounds at this stage to form an iron- or rare-earth containing tialite. It is preferred to continue the heating step until tialite constitutes at least 5%, more preferably at least 15% of the weight of the crystalline materials in the body. In some embodiments, the heating step is continued until the tialite constitutes at least 35% of the weight of the crystalline materials. The heating step may be continued until the tialite constitutes as much as 60% or in some embodiments up to 50%, of the weight of the crystalline materials in the body. The heating step may be continued until the body contains at least 75%, more preferably at least 90%, and still more preferably at least 95% by weight of the crystalline materials in the body.

The proportion of tialite that is found in the resulting composite body by powder X-ray diffraction often is somewhat less than that which is predicted from the composition of the green body. As mentioned before, this may be due to incomplete reaction or loss of titanium compounds through the formation of gaseous reaction products during the fluorotopaz-forming or fluorotopaz-decomposition steps.

It may be necessary or desirable to remove residual fluorine from the composite. This is conveniently accomplished by heating the composite to a temperature of at least 1200° C., such as from 1200 to 1460° C. for a period of time. This heating step is preferably performed in the presence of an atmosphere that contains some water, such as moist air or other inert atmosphere that contains some quantity of moisture. The amount of water needed in the atmosphere is generally not large, and the ambient humidity is usually sufficient. This heating step can be performed simultaneously with the tialite-forming step described before, which is preferred because doing so eliminates a separate process step and associated costs.

In a variation of the process, a porous, acicular mullite body is formed in any convenient manner, in the substantial absence of a source of titanium atoms. Typically, this is done by forming a green body containing a source of aluminum and silicon atoms, heating it in the presence of a $SiF_4$ to form a fluorotopaz and then decomposing the fluorotopaz to form the acicular mullite body. A source of titanium is then applied to the acicular mullite body, and the body is heated to 1450-1750° C. in an inert atmosphere. The body may be held at this temperature for a period of from 1 to 20 hours or more, preferably up to 12 hours and more preferably from 5 to 10 hours. In some embodiments, one or more sources of aluminum, one or more sources of iron and one or more sources of rare earth element(s) also may be applied to the acicular mullite body before performing this heating step. During this step, at least a portion of the titanium source reacts to form tialite, which may contain iron and/or the rare earth; the needed aluminum is provided by the acicular mullite or added aluminum source. A convenient way of applying the various reactants to the acicular mullite body is to soak the body in a slurry of particles or solution of the oxide(s), and then drying at an elevated temperature if desired. This step can be performed multiple times as needed to provide the desired quantity of reactants.

The product of either variation of the process retains much of the porosity of the acicular mullite body. The body after the tialite-forming retains the needle-like structure of the acicular mullite, although the structure of the mullite needles tends to become less well defined as the tialite content increases. However, the composite retains much of its porosity even when the tialite content is quite high.

The open porosity of the composite can range from 30 to as much as 85 volume percent and more typically ranges from 45 to 75% or from 48 to 65% or from 48 to 60%, as measured by water intrusion methods. The choice of starting materials to make the acicular mullite, especially the silicon source and the amount of carrier fluid, can affect the porosity of the composite. When fumed silica is used as the silicon source, porosities can be up to 50% greater than when an equivalent weight of powdered quartz is used. This is believed to be due to the large amount of carrier fluid that is needed to disperse fumed silica into the other materials when making the green body. When using powdered quartz as a source of silicon, porosities greater than about 50% typically require the presence of a porogen in the green body, particularly when sources of silica other than fumed silica are used in the synthesis. Porosities also tend to decrease somewhat with increasing tialite content.

Volume average pore diameter is typically less than 50 μm, and is often between 1 and 30 μm and preferably from 10 to 25 μm. Pore diameters are measured using mercury porosimetry methods.

The product generally has a lower CTE than acicular mullite bodies of comparable porosity. The product often has a CTE of no more than 5 ppm/° C., measured over the range from 20 to 800° C. The CTE tends to decrease with increasing tialite content. Composites in accordance with the invention may have a CTE of from 1.0 to 5.0 ppm/° C., from 2.0 to 5.0 ppm/° C., or from 3.0 to 5.0 ppm/° C. over the range from 20 to 800° C., measured by the dilatometer method described before.

The composite body also tends to have mechanical properties that are intermediate to those of acicular mullite and tialite.

Composite acicular mullite-tialite bodies made in accordance with the invention are useful in a variety of filtration applications, and/or as carriers for various types of functional materials, of which catalysts are of particular interest. The thermal stability of the composite bodies makes them well suited for high temperature applications, such as for treating exhaust gases from mobile or stationary power plants.

The composite body can be used as a particulate filter, especially for removing particulate matter from power plant (mobile or stationary) exhaust gases. A specific application of this type is a soot filter for an internal combustion engine, especially a diesel engine.

Functional materials can be applied to the composite body using various methods. The functional materials may be organic or inorganic. Inorganic functional materials such as metals and metal oxides are of particular interest as many of these have desirable catalytic properties, function as sorbents or perform some other needed function. One method of introducing a metal or metal oxide onto the composite body is by impregnating the body with a solution of a salt or acid of the metal, and then heating or otherwise removing the solvent and, if necessary, calcining or otherwise decomposing the salt or acid to form the desired metal or metal oxide.

Thus, for example, an alumina coating or a coating of another metal oxide is often applied in order to provide a higher surface area upon which a catalytic or sorbent material can be deposited. Alumina can be deposited by impregnating the composite body with colloidal alumina, followed by drying, typically by passing a gas through the impregnated body. This procedure can be repeated as necessary to deposit a desired amount of alumina. Other ceramic coatings such as titania can be applied in an analogous manner.

Metals such as barium, platinum, palladium, silver, gold and the like can be deposited on the composite body by impregnating the body (which is preferably coated with alumina or other metal oxide) with a soluble salt of the metal, such as, for example, platinum nitrate, gold chloride, rhodium nitrate, tetraamine palladium nitrate, barium formate, followed by drying and preferably calcination. Catalytic converters for power plant exhaust streams, especially for vehicles, can be prepared from the composite body in that manner.

Suitable methods for depositing various inorganic materials onto a porous mullite body are described, for example, in US 2005/0113249 and WO 01/045828. These processes are generally useful in relation to the composite body of this invention.

In an especially preferred embodiment, alumina and platinum, alumina and barium or alumina, barium and platinum can be deposited onto the composite body in one or more steps to form a filter that is simultaneously capable of removing particulates such as soot, $NO_x$ compounds, carbon monoxide and hydrocarbons from a power plant exhaust, such as from vehicle engines.

The following examples are provided to illustrate the invention but are not intended to limit the scope thereof. All parts and percentages are by weight unless otherwise indicated.

Examples 1-4

Composites are made by homogenizing mixtures of starting materials as listed in Table 1 and then pressing the resulting mixtures into round, 25-mm diameter, 4-mm thick pellets at about 3000 pounds (1364 kg) of pressure. Duplicate pellets are formed. The pellets are heated under vacuum to 700° C. $SiF_4$ gas is then introduced to a partial pressure of 150 torr (20 kPa) over the course of about 200 minutes during which time fluorotopaz forms. The temperature is then increased at a rate of 2° C./minute until the temperature reaches 1060° C., and then at a rate of 1° C./minute until the temperature reaches 1150° C., maintaining the $SiF_4$ partial pressure at about 150 torr (20 kPa). $SiF_4$ begins to evolve when the temperature reaches about 1000° C., indicating the start of fluorotopaz decomposition and the formation of acicular mullite. The reactor is held at 1150° C. for 3 hours. The $SiF_4$ gas is then evacuated from the reactor and the temperature of the resulting body is reduced to room temperature.

Small (about 1 gram) portions of the resulting intermediates are ground to powder and analyzed by powder X-ray diffraction to ascertain the composition of their respective crystalline phases. Results are as indicated in Table 2 below. Micrographs obtained by scanning electron microscopy (SEM) are obtained for each of the intermediates. In each case, the intermediate is seen to have an interconnected needle structure typical of acicular mullite.

To produce Examples 1-4, one of each of the intermediates is then heated in air over a period of seven hours to 1500° C., held in air at that temperature for about 8 hours and then cooled in air to room temperature over 6 hours. X-ray diffraction analysis on powdered portions of the resulting composites is performed to determine the composition of their crystalline components. Results are indicated in Table 3. The water-accessible porosity and CTE of the composites are determined in each case, with results as indicated in Table 3.

TABLE 1

Green Body Composition (inorganics only)

| | Parts by Weight | | | | | | Target tialite content, by weight |
|---|---|---|---|---|---|---|---|
| | κ-$Al_2O_3$ | $SiO_2$ | $TiO_2$ | $Al_2TiO_5$ | MgO | $Fe_2O_3$ | |
| Example 1 | 31.97 | 7.05 | 10.98 | 0 | 0.50 | 0.50 | ~50% |
| Example 2 | 30.57 | 7.05 | 10.98 | 0 | 0.50 | 2.19 | ~50% |
| Example 3 | 17.95 | 7.05 | 0 | 25.00 | 0.50 | 0.50 | ~50% |
| Example 4 | 17.95 | 7.05 | 0 | 25.00 | 0.50 | 2.19 | ~50% |

TABLE 2

Composition of intermediates

| | |
|---|---|
| Example 1 | 96% mullite, 1.3% $Fe_2TiO_5$, 1.2% $Ti_3O_5$, 0.9% anatase $TiO_2$, 0.5% $SiO_2$ |
| Example 2 | 95% mullite, 1.6% $Ti_3O_5$, 0.3% anatase $TiO_2$, 2.9% $SiO_2$ |
| Example 3 | 83% mullite, 7.2% $Al_2O_3$, 4.4% $Ti_4O_7$, 2.4% $Fe_3Ti_3O_{10}$, 1.2% anatase $TiO_2$ |
| Example 4 | 94% mullite, 2.6% $Ti_4O_7$, 1.7% $Fe_3Ti_3O_{10}$, 1.3% anatase $TiO_2$ |

The data in Table 2 does not include any amorphous materials as may be present in the intermediates. This data does indicate that the reactions which produce acicular mullite proceed well in the presence of titanium oxides. Not only do tialites not form during under the conditions of the acicular mullite-forming reactions, but it is seen from the Example 2 and 3 data that aluminum titanate which is present in the starting green body is consumed during the acicular mullite-forming reactions. This is true even though enough alumina is present in the starting green body to fully react with the silica to form acicular mullite, so that in theory it is not necessary to parasitize the aluminum titanate to fully convert all of the starting silica to acicular mullite. It is also seen that much of the starting titanium compound is converted into one or more suboxide forms ($Ti_3O_5$, $Ti_4O_7$, $Fe_3Ti_3O_7$) under the conditions of the acicular mullite-forming reactions.

TABLE 3

Composition and Properties of Composite Acicular Mullite-Tialite Bodies

| Ex. No. | Crystalline Phase Composition | Porosity, % | CTE (ppm/° C.) |
|---|---|---|---|
| 1 | 69% mullite, 28% tialite, 2% rutile $TiO_2$ | 56.9 | 4.98 |
| 2 | 69% mullite, 29% tialite, 2% rutile $TiO_2$ | 56.8 | 4.07 |
| 3 | 66% mullite, 34% tialite | 49.3 | 3.80 |
| 4 | 70% mullite, 30% tialite | 45.7 | 3.21 |

As can be seen from the data in Table 3, tialite is produced during the final heating step in all cases. The amount of tialite that forms is in all cases significantly lower than the target, which indicates either the presence of a titanium-containing glassy phase, or the loss of titanium during one or more of the various heating steps (or some combination of both). Porosities remain essentially unchanged from the intermediates.

The composites (Examples 3 and 4) made using aluminum titanate rather than titanium dioxide as the titanium source develop higher tialite contents. This is despite the fact that aluminum titanate which is present as a starting material is consumed during the acicular mullite-forming steps and is not found in the intermediates. The higher tialite content is believed to be due to the closer proximity of aluminum and titanium atoms that is obtained when aluminum titanate is used as a starting material. When separate sources of titanium and aluminum are instead used, aluminum and titanium atoms may not be in such close proximity and, due to the fact that the tialite-forming reaction is a solid-state reaction under these conditions, may be less able to come into contact so they can react to produce tialite.

All of the composites of the invention have CTE values lower than acicular mullite. In general, the reduction in CTE tends to track with increasing tialite content.

When duplicate samples are heated to only 1400° C. in the tialite-forming step, tialite is seen to form in most cases, but the amount of tialite that forms tends to be lower, and the CTE tends to be very close to that of acicular mullite by itself.

FIG. 1 is a SEM micrograph of Example 4. This figure illustrates the highly porous structure of the composite of the invention and, despite the presence of significant amounts of tialite, the retention of an interconnected needle structure characteristic of acicular mullite bodies. Nonetheless, even though the interconnected needle structure is maintained, the CTE of this body is substantially lower than those of acicular mullite by itself. This indicates that tialite or some other phase is becoming inserted at grain boundaries of the mullite crystals, such as at points of intersection between needles, allowing a reduction of CTE to be seen while still preserving the interconnected needle structure.

Figure 2:
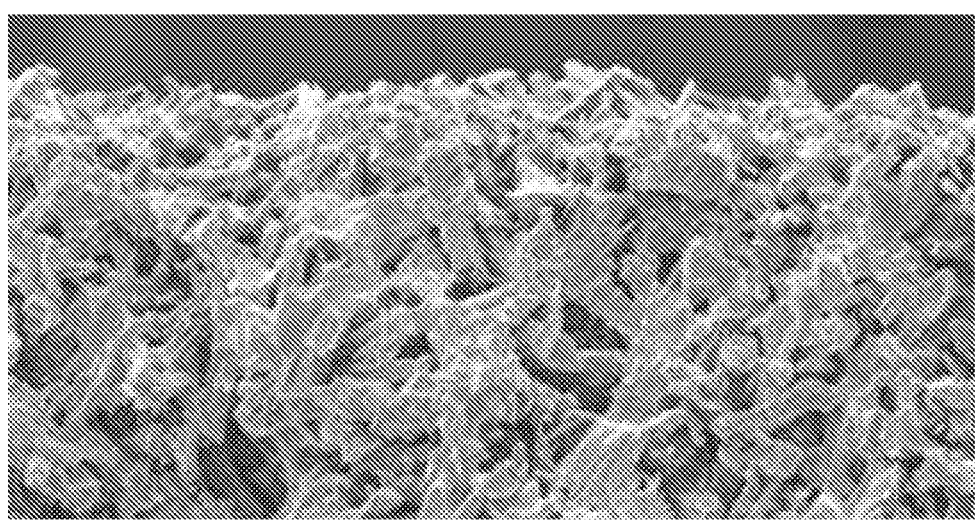
FIG. 2 is a micrograph of a portion of the surface of the ceramic body of the invention as described in Example 4.

FIG. 2 is a micrograph showing surface features of a portion of Example 4. This micrograph illustrates only a small number of needles protruding from the surface, which is desired because the more uniform surface produces less friction with a traversing gas, which in turn allows for lower pressure drops through the body.

Examples 5 and 6 and Comparative Sample A

A premix is made by blending the following materials:

| Premix Ingredient | Parts by Weight |
|---|---|
| Fresh ball clay | 26 |
| Calcined clay | 25 |
| Kappa alumina | 46 |
| Talc | 2.7 |
| Iron oxide | 0.3 |

95 parts of this premix are blended with 53.3 parts alumina, 41.7 parts titanium dioxide, 8.2 parts iron oxide, 29.5 parts graphite particles, 13.77 parts of methylcellulose and 92 parts of water to form a paste that is extruded into ribbons. The ribbons are debindered and calcined in reduced-oxygen air (6% $O_2$) from room temperature to 120° C. in one hour, from 120° C. to 350° C. in eight hours, from 350° C. to 550° C. in two hours, from 550° C. to 930° C. in 15 hours, holding at 930° C. for 3 hours, and then cooling to room temperature in 20 hours. The ribbons are reacted with $SiF_4$ at a partial pressure of 150 Torr to form fluorotopaz and then further heated at a temperature up to 1150° C. to decompose the fluorotopaz and form acicular mullite, and then cooled. X-ray diffraction of a powdered sample of the resulting intermediate indicates that crystalline portion thereof contains 83% by weight mullite, 7% titania, 7% $Fe_2TiO_5$, and 3% iron.

The intermediates are then heated at a rate of 200° C./hour to a temperature of 1500° C. under air, held at that temperature for 3 hours and then cooled to room temperature over 15 hours. X-ray diffraction of a powdered sample from the resulting ribbons (Example 5) shows that the crystalline portion thereof contains 63% mullite and 37% tialite. A clear acicular structure is observed by SEM.

Example 5 exhibits a modulus of rupture of 9.1 MPa, an elastic modulus of 8.1 GPa, a CTE of 3.1 ppm/° C., a porosity of 53% and a mean pore size of 9.6 microns.

The Example 5 products warp significantly during the final tialite-forming stage.

Example 6 is produced in the same manner as Example 5, except that during the tialite-forming step, the ribbons are heated to 1100° C. at 200° C./hour, but thereafter heated to 1500° C. at only 50° C./hour. This results in much less warping than is seen in Example 5. The crystalline portion of the Example 6 product contains 64% mullite and 36% tialite. A clear acicular structure is observed by SEM. Example 6 exhibits a modulus of rupture of 8.2 MPa, an elastic modulus of 7.5 GPa, a CTE of 2.9 ppm/° C., a porosity of 53% and a mean pore size of 10.8 microns.

Comparative Sample A is produced in the same manner as Example 6, except the maximum temperature in the tialite-forming step is only 1400° C. The resulting material lacks an acicular structure, contains significant amounts of alumina and titanium dioxide but little tialite, and has a CTE equal to that of acicular mullite by itself.

What is claimed is:

1. A porous composite ceramic body comprising interspersed and bonded acicular mullite and tialite crystals, wherein the acicular mullite crystals constitute from 25 to 95% by weight of the crystalline ceramic materials in the composite ceramic body, the tialite crystals constitute from 5 to 75% by weight of the crystalline ceramic materials in the ceramic body, the porous composite ceramic body has porosity of 40 to 60 volume percent and other crystalline ceramic materials constitute from 0 to 5% by weight of the crystalline ceramic materials in the composite ceramic body.

2. The composite ceramic body of claim 1 which has a CTE, as measured by heating the sample at 5° C./minute, of 1.0 to 5.0 ppm/° C. over the temperature range from 20 to 800° C.

3. The composite ceramic body of claim 1, wherein the tialite is aluminum titanate, iron aluminum titanate or a rare earth aluminum titanate.

4. The composite ceramic body of claim 1, wherein the crystalline ceramic phase contains from 40 to 80% by weight of acicular mullite and 15% to 60% by weight of tialite.

5. The composite ceramic body of claim 1, wherein the crystalline ceramic phase contains from 65 to 85% by weight of acicular mullite and 15% to 35% by weight of tialite.

6. A process for forming an acicular mullite-tialite composite body comprising firing an acicular mullite body at a temperature of from 1450 to 1750° C. in the presence of a source of titanium, to produce the acicular mullite-tialite composite body, wherein the acicular mullite-tialite composite body has a porosity of 40 to 60 volume percent.

7. The process of claim 6 wherein the firing step is performed in an oxidizing atmosphere.

8. The process of claim 6 wherein the firing step is performed by heating the body to 1100° C., and then further heating the body from 1100° C. to the processing temperature at a rate of 5 to 100° C./hour.

9. A process for forming a composite acicular mullite-tialite body comprising the steps of:

(a) forming a green body containing a source or sources of aluminum, silicon and titanium;
(b) heating the green body in the presence of a gaseous fluorine source at a temperature sufficient to convert a portion of the green body to fluorotopaz;
(c) further heating the green body at a temperature of from 850° C. to 1250° C. under conditions such that the fluorotopaz decomposes to form a porous acicular mullite body that contains, in addition to the acicular mullite, one or more titanium compounds and one or more aluminum compounds; and
(d) firing the porous acicular body at a temperature of from 1450 to 1750° C. to cause at least a portion of the titanium compound(s) and at least a portion of the aluminum compound(s) to react to form tialite and produce the acicular mullite-tialite composite body, wherein the composite acicular mullite-tialite body has a porosity of 40 to 60 volume percent.

10. The process of claim 9, wherein step (d) is performed at a temperature of at least 1500° C.

11. The process of claim 9, wherein step (d) is performed in an oxidizing atmosphere.

12. The process of claim 9, wherein the green body formed in step (a) contains an iron oxide.

13. The process of claim 9 wherein the green body formed in step (a) contains at least 1.5 moles of aluminum atoms per mole of silicon atoms plus at least two moles of aluminum atoms per mole of titanium atoms.

14. The process of claim 9 wherein step d) is performed by heating the body to 1100° C., and then further heating the body from 1100° C. to the processing temperature at a rate of 5 to 100° C./hour.

15. The process of claim 9 wherein the porous acicular mullite body formed in step (c) contains less than 3% by weight of a tialite, based on the weight of crystalline materials in the body.

16. The process of claim 6, wherein the composite acicular mullite-tialite body has a CTE, as measured in air at a heating rate of 5° C./minute, of 1.0 to 5.0 ppm/° C. over the temperature range from 20 to 800° C.

17. The process of claim 6, wherein the composite body has a CTE of 2.0 to 5.0 ppm/° C. over the temperature range of 20 to 800° C.

* * * * *